United States Patent [19]

Kaneda

[11] Patent Number: 5,214,551
[45] Date of Patent: May 25, 1993

[54] MECHANISM FOR POSITIONING A MAGNETIC HEAD AND A PINCH ROLLER IN A TAPE RECORDER WITHOUT RELIANCE ON A SOLENOID

[75] Inventor: Makoto Kaneda, Hatoyama, Japan

[73] Assignee: Kyowa Electric & Chemical Co., Ltd., Tokyo, Japan

[21] Appl. No.: 938,587

[22] PCT Filed: Oct. 4, 1988

[86] PCT No.: PCT/JP88/01012
§ 371 Date: Feb. 7, 1990
§ 102(e) Date: Feb. 7, 1990

[87] PCT Pub. No.: WO90/04250
PCT Pub. Date: Apr. 19, 1990

Related U.S. Application Data

[63] Continuation of Ser. No. 460,080, Feb. 7, 1990, abandoned.

[51] Int. Cl.[5] .................. G11B 5/54; G11B 15/295; G11B 15/44
[52] U.S. Cl. .................. 360/105; 360/96.4; 242/201
[58] Field of Search .............. 360/96.1, 96.3, 96.4, 360/105, 93, 90, 74.1, 73.01, 137; 242/201, 208, 200

[56] References Cited

U.S. PATENT DOCUMENTS

| 4,131,922 | 12/1978 | Yoshida et al. | 360/90 |
| 4,734,806 | 3/1988 | Komatsu | 360/96.4 |
| 4,819,891 | 4/1989 | Kamijo | 360/96.4 |
| 4,922,357 | 5/1990 | Komatsu et al. | 360/96.3 |
| 4,956,734 | 9/1990 | Kamijo | 360/105 |
| 5,005,094 | 4/1991 | Komatsu et al. | 360/105 |

FOREIGN PATENT DOCUMENTS

| 0347739 | 12/1989 | European Pat. Off. |
| 53-88706 | 8/1978 | Japan |
| 55-139650 | 10/1980 | Japan |
| 58-146047 | 8/1983 | Japan |

Primary Examiner—Stuart S. Levy
Assistant Examiner—Craig A. Renner
Attorney, Agent, or Firm—Frishauf, Holtz, Goodman & Woodward

[57] ABSTRACT

A driving device of a tape recorder in which a sliding plate supporting a magnetic head and a pinch roller is arranged for movement relative to a base and the sliding plate is adapted to be driven to an operating position where the pinch roller comes into a cooperating condition with a capstan at a record-play operation. The driving device includes a cam to drive the sliding plate and such cam, at an initial period of the record-play operation, is driven by a predetermined angle in a predetermined direction to engage the sliding plate, thereby causing the sliding plate to move to the operating position. The driving device is provided with a driven gear continuously driven by a motor and a partially toothed gear which frictionally engages the driven gear to thereby drive the cam.

7 Claims, 11 Drawing Sheets

MECHANISM FOR POSITIONING A MAGNETIC HEAD AND A PINCH ROLLER IN A TAPE RECORDER WITHOUT RELIANCE ON A SOLENOID

This application is a continuation, of application Ser. No. 07/460,080, filed Feb. 7, 1990, now abandoned.

FIELD OF THE INVENTION

This invention relates to a driving device of a tape recorder. More particularly, this invention relates to a driving device of a tape recorder adapted to drive a sliding plate supporting a magnetic head and a pinch roller against a magnetic tape cassette and also adapted to impart a drive for record-play, fast forward and rewind to a tape reel of the magnetic tape cassette.

PRIOR ART

In a driving device of a conventional tape recorder, tape reels at the feeding side and the take-up side of a magnetic tape cassette are mounted to engage corresponding reel shafts respectively and a sliding plate supporting a magnetic head and a pinch roller is mounted for displacement with respect to the tape cassette between an operating position and a retracted position. In the operating position, the pinch roller is positioned to hold a tape between itself and a capstan, and the magnetic head is held in contact with the tape fed out from the magnetic tape cassette. In the retracted position, the pinch roller and the magnetic head are held apart from the tape. The sliding plate is biased by a spring toward the retracted position. For rewind and fast forward operations, a required rotation is given to the tape reels with the sliding plate held in the retracted position. For record and play operations, the sliding plate is moved to the operating position and the tape reels are driven at a record-play speed.

In the tape recorder of the prior art, electromagnetic solenoid means is provided so as to drive the sliding plate from the retracted position to the operation position and, throughout the record-play operation of the tape recorder, the electromagnetic solenoid means is energized so as to hold the sliding plate in the operation position. This prior art arrangement has an inherent problem that the power consumption is large because of the necessity of the continuous energization of the solenoid means during the record-play operation. Moreover, the electromagnetic solenoid means for driving the sliding plate is bulky, so that it interferes with miniaturization of the device.

DISCLOSURE OF INVENTION

The invention is mainly directed to providing a driving device of a tape recorder which does not require any electromagnetic solenoid means for moving the sliding plate which supports the magnetic head and the pinch rollers.

Another object of the invention is to provide a driving device of a tape recorder which is light in weight, small in size and of less power consumption.

To this end, according to the invention, cam means is provided to control the position of the sliding plate. The cam means is provided with cam driving means which rotates the cam means by a predetermined angle in one direction in the record-play operation thereby forcing the sliding plate into the operating position. According to a preferred aspect of the invention, means for the fast forward and the rewind operation is provided. As the direction of the fast forward is the same as that of the feeding in the record-play operation, it is necessary to cause the sliding plate to be forced into the operating position only in the record-play operation but not forced into the operating position in the fast forward operation. To this end, according to the invention, the cam driving means is so constituted as to provide the cam means with a rotation for forcing the sliding plate into the operating position only in record-play operation.

The driving means has a capstan connected to and driven by a driving source and driving gears are fixed on the shaft of the capstan to define a driving system for the tape reels. Each tape reel is provided with a driven gear which is engaged with the driving gear through an idler gear respectively. Each idler gear is rotatably mounted on an idler arm at its each end, said idler arm being swingably provided on the capstan shaft. Neither idler gear engages the corresponding driven gear when the idler arm is at the neutral position, but, one idler gear engages the driven gear on one tape reel when the idler arm swings to one direction while the other idler gear engages the driven gear on the other tape reel when the idler arm swings to the other direction.

According to a preferred aspect of the present invention, the sliding plate is provided with a stopper for preventing the idler arm from swinging from the neutral position toward the said one direction. The stopper releases the idler arm when the sliding plate moves by a predetermined distance from the retracted position toward the operating position. In this release condition, the idler arm swings toward the said one direction under the effect of the driving force of the driving gear, thereby allowing the said one idler gear to engage the driven gear on the said one tape reel. According to one aspect of the invention, the cam means is used to cause the sliding plate to move by the said predetermined distance from the retracted position toward the operating position, that is, the cam means is given a rotation to engage the sliding plate to cause it to move.

According to a further preferred aspect of the present invention, a partially toothed gear with two non-toothed portions is provided as the cam driving means, which is caused to engage a driving gear to which the continuous drive is imparted from the driving source. The driving gear may be the same as that, or may be different from that, for driving the driven gear on the tape reel. According to one feature of the present invention, the said second driving gear is so constructed as to be arranged coaxially with the first driving gear to rotate simultaneously with it. The partially toothed gear is provided with a protrusion means to engage the cam means when the partially toothed gear is rotated in one direction, thereby rotating the cam means. When the cam means is thus rotated, it engages the sliding plate to move it by a predetermined distance from the retracted position to the operating position. When the cam means rotates by a predetermined angle, the first non-toothed portion of the partially toothed gear reaches the position facing of the driving gear to cause the partially toothed gear disengaged from the driving gear, thereby stopping the rotation of the partially toothed gear.

According to a further preferred aspect of the present invention, the partially toothed gear is provided with a stopper for preventing the idler arm from swinging from the neutral position to the said other direction. When the partially toothed gear is driven to the opposite direction from the said one direction, the stopper on the partially toothed gear is released and the idler arm swings to the said opposite direction to cause the said other idler gear to engage the driven gear on the said other tape reel. Thus, the second non-toothed portion of the partially toothed gear reaches a position wherein it faces the driving gear to stop the rotation of the partially toothed gear. The partially toothed gear is coupled through friction means to the driven gear to which a continuous drive is imparted from the driving source. A protrusion means is formed on the partially toothed gear, which engages the sliding plate when the partially toothed gear is rotated from the stop position in the aforementioned one direction by a second predetermined angle which is smaller than the aforementioned predetermined angle, thereby forcing the sliding plate into an intermediate position between the retracted position and the operating position. In the record-play stage, the partially toothed gear is rotated to the said one direction first to locate the sliding plate at the intermediate position between the retracted position and the operating position. Then, the partially toothed gear is rotated to the opposite direction. The partially toothed gear is provided with a second protrusion which is engaged with the cam means when the gear is rotated in this direction to rotate the cam means to the said opposite direction. The cam means is rotated by the second protrusion to engage the sliding plate, thereby forcing the sliding plate into the operating position. In the condition where the sliding plate is forced into the operating position, the first toothless portion of the partially toothed gear reaches the position facing to the driving gear to stop the rotation of the partially toothed gear.

According to a preferred aspect of the present invention, means is provided for, displacing the cam means in the axial direction to cause it to engage the partially toothed gear when the cam means is rotated to an extent in which the sliding plate is shifted to the operating position. This means is provided for causing the cam means to return simultaneously to the original position when the partially toothed gear is rotated back to the original position at the time when the operation of the tape recorder is stopped. When the cam means returns to its original position, it is shifted in the axial direction and returned to its original axial position. Thus, the cam means is disengaged from the partially toothed gear.

BRIEF DESCRIPTION OF THE DRAWINGS

FIGS. 14 (a)(b)(c) are diagrams of an actuating current of the driving device.

DESCRIPTION OF PREFERRED
EMBODIMENTS OF THE INVENTION

The invention will now be described with reference to preferred embodiments shown in the drawings.

GENERAL CONSTITUTION

Figure 1:
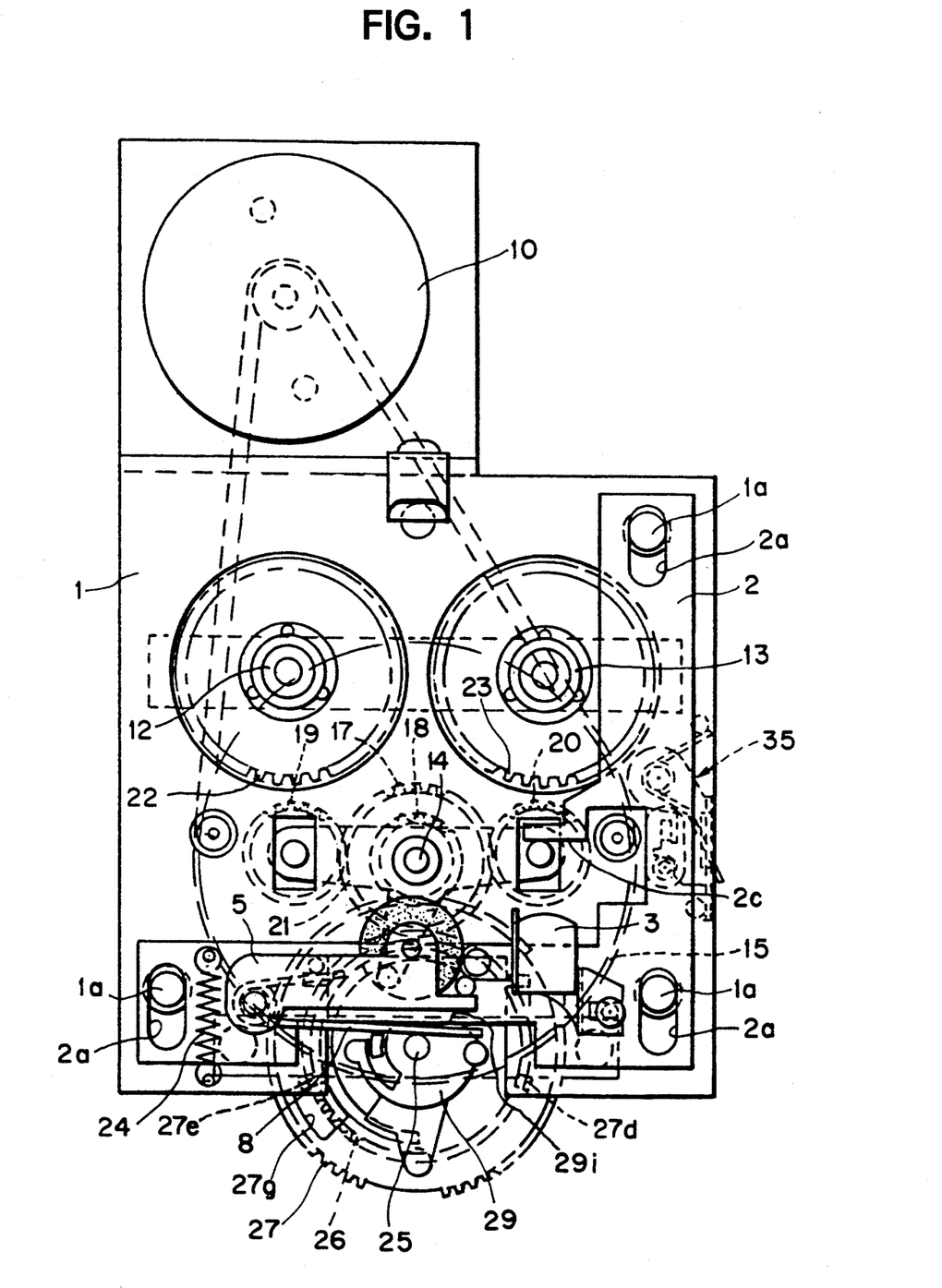
FIG. 1 is a plan view showing an overall driving device of the present invention.
Figure 2:
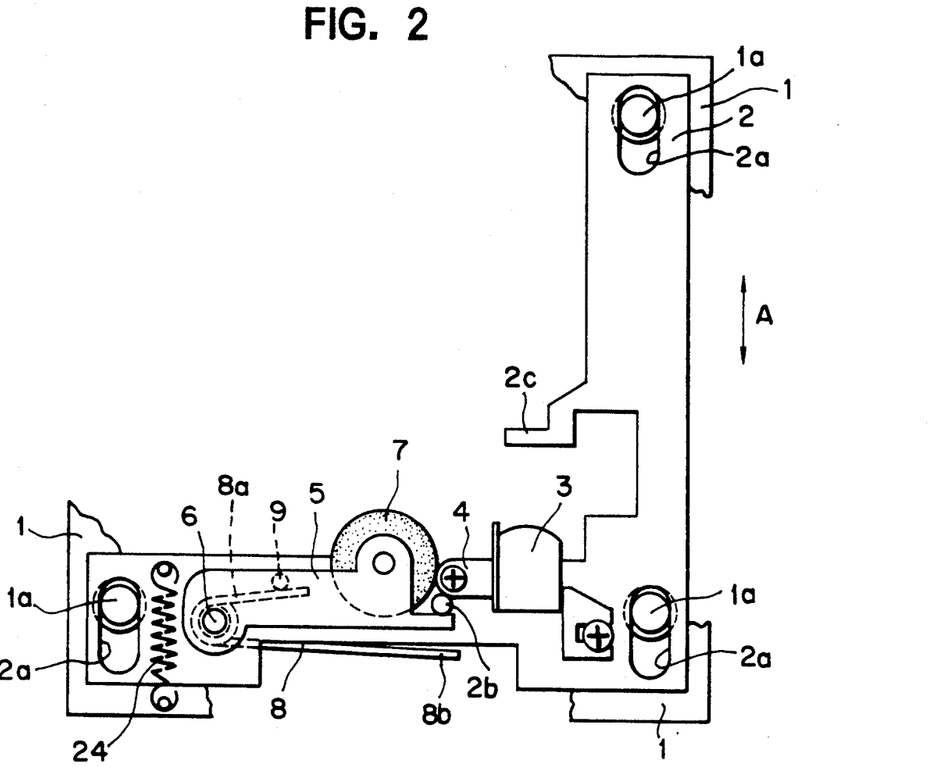
FIG. 2 is a detailed plan view of a sliding plate.

Referring first to FIG. 1, a driving device of a tape recorder, an embodiment of the invention, has a base 1 and a sliding plate 2 provided on the base 1. As shown in FIG. 2, the sliding plate 2 has a substantially "L" shaped plane configuration and is provided with oval holes 2a extending in the fore and aft directions. These oval holes 2a slidably engage pins 1a mounted on the base 1, whereby the sliding plate 2 is movable on the base 1 in the direction of arrow A in FIG. 2. A magnetic head 3 is mounted on the sliding plate 2 with a bracket 4. On the sliding plate 2, a pinch roller arm 5 is pivotably mounted by a shaft 6 and a pinch roller 7 is pivotably mounted to a free end of the pinch roller arm 5. A spring 8 is wound around the shaft 6 and the spring 8 contacts a pin 9 provided on the pinch roller arm 5 at its one end 8a. The other end 8b of the spring 8 is free. A stopper 2b for restricting counterclockwise rotation of the pinch roller arm 5, as it is shown in FIG. 2, is provided on the sliding plate 2.

Figure 3:
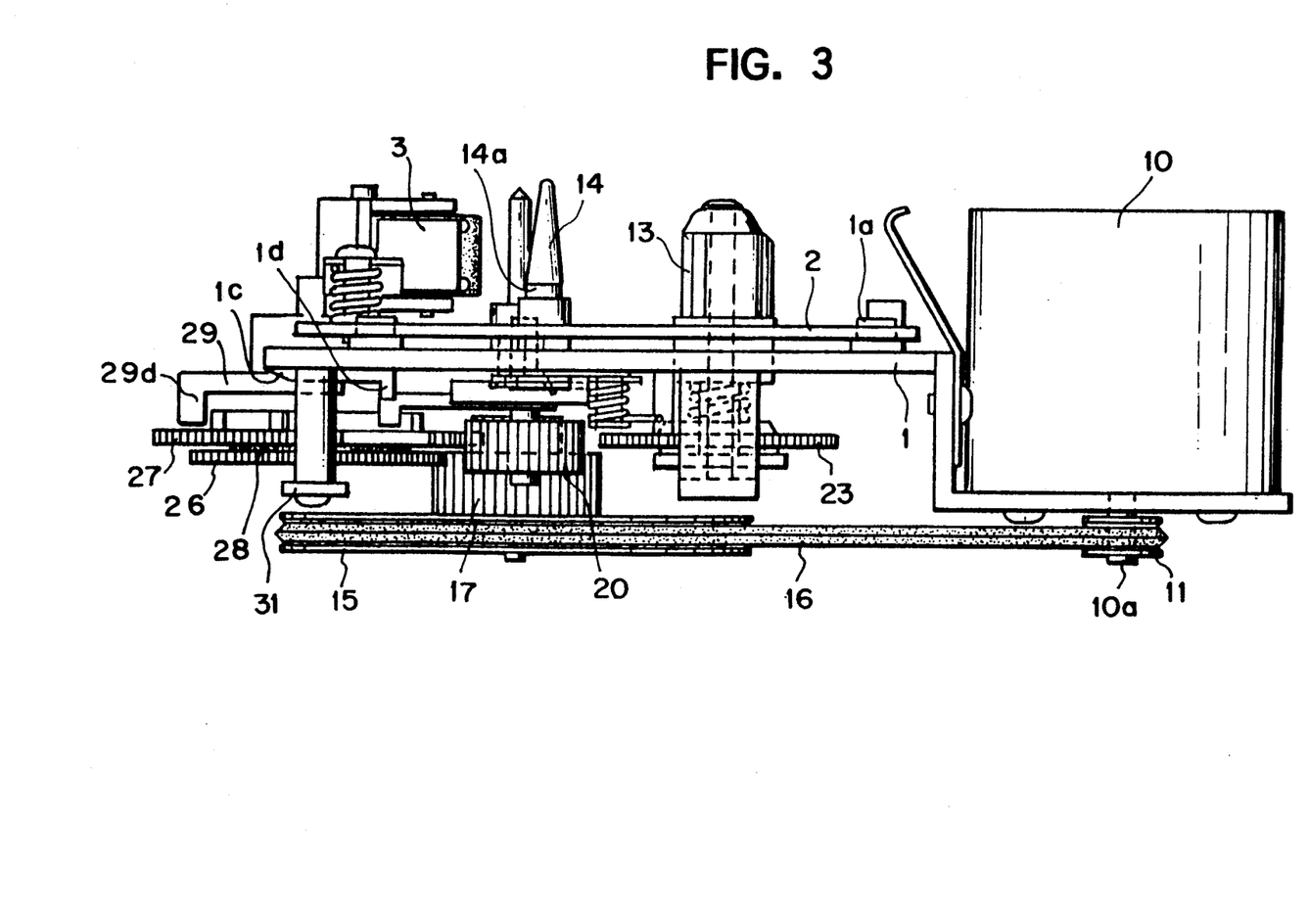
FIG. 3 is a side view of the driving device shown in FIG. 1.

As shown in FIG. 1 and FIG. 3, an electric motor 10 is mounted on the base 1. The output shaft 10a of the electric motor 10 protrudes downwardly from the base 1 and a driving pulley 11 is connected to the output shaft 10a. Moreover, a take-up reel shaft 12 for engaging a take-up reel of a tape cassette and a feed reel shaft 13 for engaging a feed reel of a tape cassette are provided to the base 1 in a widely known way and a capstan 14 is located apart from the reel shafts 12, 13. A capstan shaft 14a is formed integrally with the capstan 14 and extends downwardly to protrude below the base 1, and a driven pulley 15 is fixedly connected to the lower end portion thereof. A belt 16 is stretched between the driving pulley 11 and the driven pulley 15 and, through the belt 16, the driven pulley 15 and the capstan 14 are driven by the motor 10.

Two driving gears, i.e., a large driving gear 17 and a small driving gear 18, are fixedly connected to the capstan shaft 14a at the position above the pulley 15. The large driving gear 17 engages an idler gear 19 at one side and engages an idler gear 20 at the opposite side. The idler gears 19 and 20 are respectively connected rotatably to shafts 19a and 20a attached, respectively, to the opposite ends of an idler arm 21 (see FIG. 5) extending to the radial direction of the large driving gear 17. The take-up reel shaft 12 and the feed reel shaft 13 are provided with driven gears 22 and 23 respectively. The idler arm 21 is capable of swinging around the capstan shaft 14a and the idler gear 20 engages the gear 23 when the idler arm 21 swings counterclockwise while the idler gear 19 engages the gear 22 when the idler arm 21 swings clockwise. An counterclockwise torque is imparted to the idler arm 21 when the large driving gear 17 rotates counterclockwise in FIG. 1 and a clockwise torque is imparted to the idler arm 21 when the large driving gear 17 rotates clockwise.

Returning to FIG. 2, the sliding plate 2 is biased toward the front side by the spring 24 and the pinch roller 7 is kept apart from the capstan 14. Hereinafter, the said situation is called retracted position of the sliding plate 2. In record-play, the pinch roller 7 is displaced toward the capstan 14 and a tape coming out the tape cassette is held between the capstan 14 and the pinch roller 7 and then the tape is provided with a feeding force. Hereinafter, the said situation is called operating position of the sliding plate 2. In fast forward and rewind, the pinch roller 7 must be kept apart from the capstan 14. The position of the pinch roller 7 is controlled by the movement of the sliding plate 2.

Figure 4:
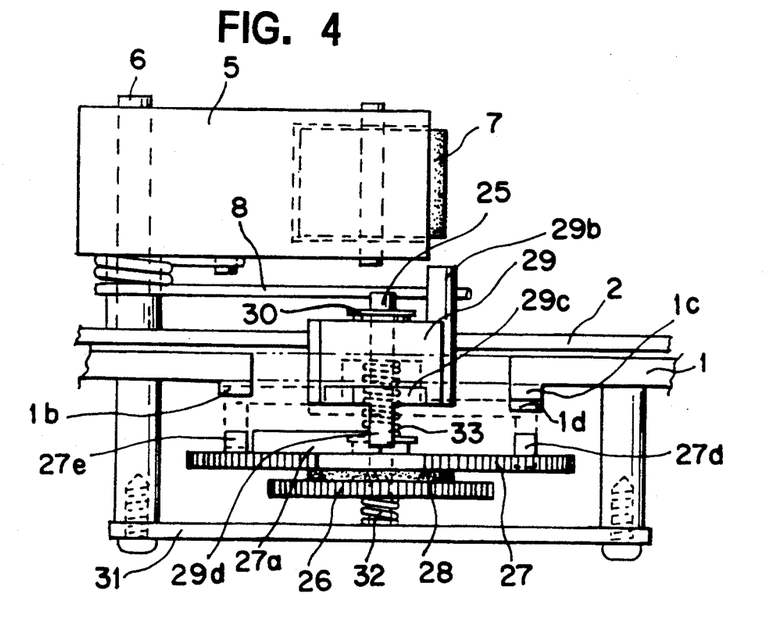
FIG. 4 is a fragmentary front view of the driving device shown in FIG. 1.

As shown in FIG. 1 and FIG. 4, a shaft 25 is provided toward the front side of base 1 and spaced from the capstan 14. A small driven gear 26 is rotatably connected to the lower part of the shaft 25 and a partially toothed gear 27 is rotatably connected to the lower part of the shaft 25 above the small driven gear 26. A friction plate 28 made of friction material such as felt is provided between the small driven gear 26 and the partially toothed gear 27. A cam 29 is rotatably connected to the shaft 25 above the partially toothed gear 27. The shaft 25 is provided with a check plate 30 which prevents the cam 29 from coming upward out the shaft 25. A support plate 31 is provided below the base 1 and a spring 32 for biasing the gear 26 toward the gear 27 is provided between the support plate 31 and the small driven gear 26. A spring 33 is provided between the cam 29 and the gear 27 and biases the gear 27 downward. As shown in FIG. 1, the small driven gear 26 engages the large driving gear 17 and the partially toothed gear 27 engages the small driving gear 18.

Figure 15:
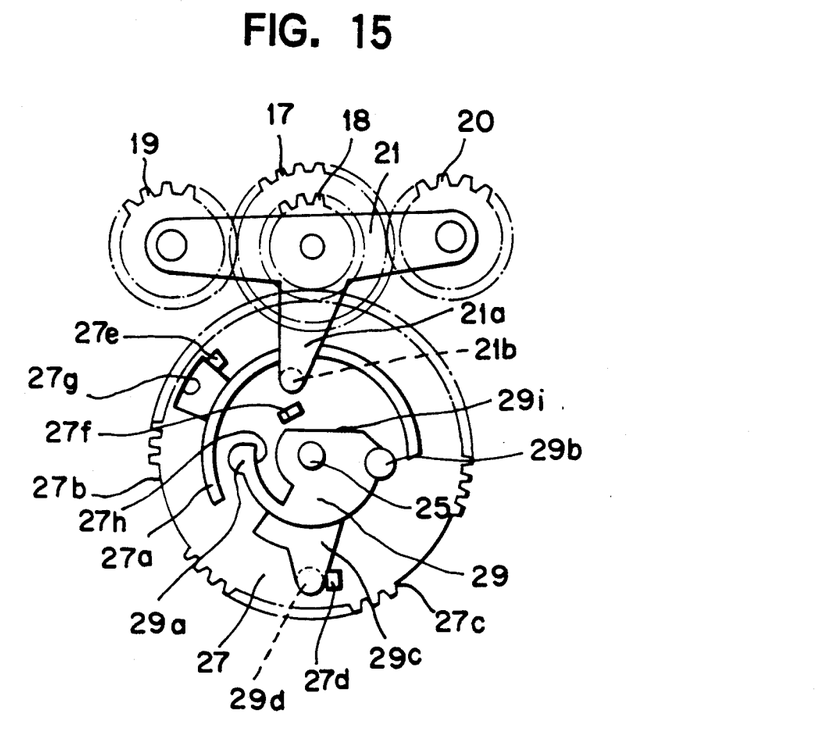
FIG. 15 is a plan view of an arrangement of the partially toothed gear, a cam and the idler arm.

Details of the partially toothed gear 27 and the cam 29 are shown in FIG. 15. The partially toothed gear 27 is an external gear and is provided on its upper surface with a protrusion 27a having the shape of a circular arc coaxial with the shaft 25. The protrusion 27a is formed to range over an angle slightly larger than 180°. A non-toothed portion 27b removed of external teeth is provided opposite to one end of the protrusion 27a. The second non-toothed portion 27c is provided approximately at the other end of the protrusion 27a. A protrusion 27d is provided between the non-toothed portions 27b and 27c and a protrusion 27e is provided outside of the protrusion 27a. The protrusion 27d is located at the same radial position with the protrusion 27e. A protrusion 27f is provided inside of the protrusion 27a and an opening 27g is provided between the non-toothed portion 27b and the protrusion 27e.

As shown in FIG. 15, the cam 29 has a 1st cam protrusion 29a and a 2nd cam protrusion 29b. An arm 29c extending radially and outwardly is formed between the cam protrusions 29a and 29b. As shown in FIG. 4, a pin 29d protruding downward is formed at the end of the arm 29c. The pin 29d is positioned for engaging the protrusion 27d or the protrusion 27e when the partially toothed gear 27 rotates. The cam protrusions 29a, 29b are positioned at a level for engaging an edge of the sliding plate 2. As a consequence, when the partially toothed gear 27 is driven by the small driving gear 18 and rotates, the protrusion 27d or the protrusion 27e engages the pin 29d on the arm 29c of the cam 29 in correspondence with the direction of the rotation of the partially toothed gear 27 and rotates the cam 29. The rotation of the cam 29 causes an engagement between either the protrusion 29a or 29b of the cam 29 and the edge of the sliding plate 2 in correspondence with the direction of the rotation of the cam 29 to move the sliding plate 2 upwardly in FIG. 1 against the force of the spring 24.

The protrusion 27f on the partially toothed gear 27 extends upwardly to the level of the sliding plate 2 and moves the sliding plate 2 toward the operating position against the force of the spring 24 when the partially toothed gear 27 rotates clockwise in FIG. 1. The movement of the sliding plate 2 by the protrusion 27f is limited to an intermediate position between the retracted position and the operating position. A slit 27h is formed in the cam 29 for accepting the protrusion 27f in the case of the counterclockwise rotation of the partially toothed gear 27.

Figure 7:
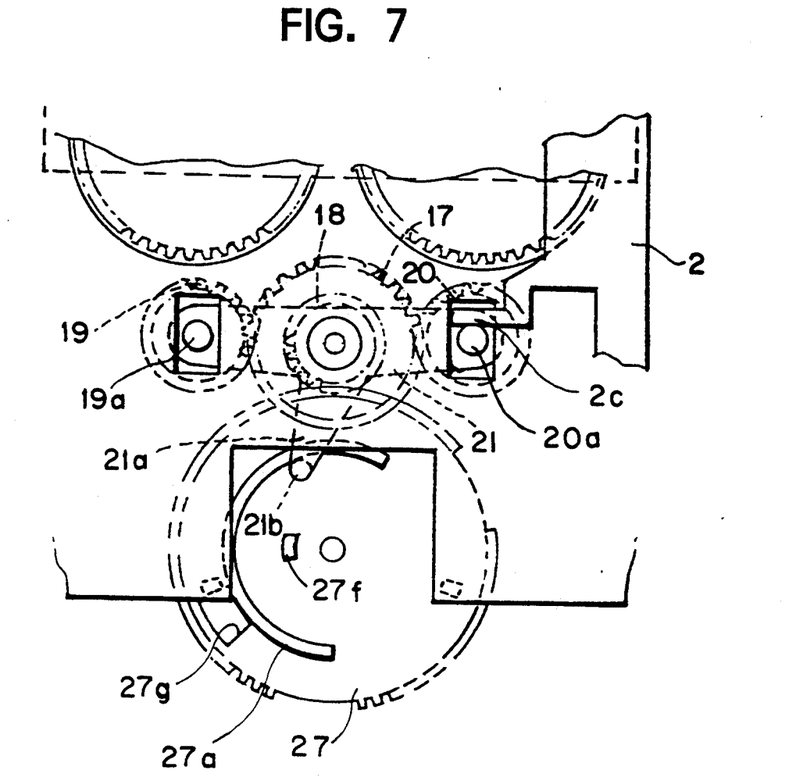
FIG. 7 is a plan view of the sliding plate and a stopper for an idler arm provided on the partially toothed gear.
Figure 8:
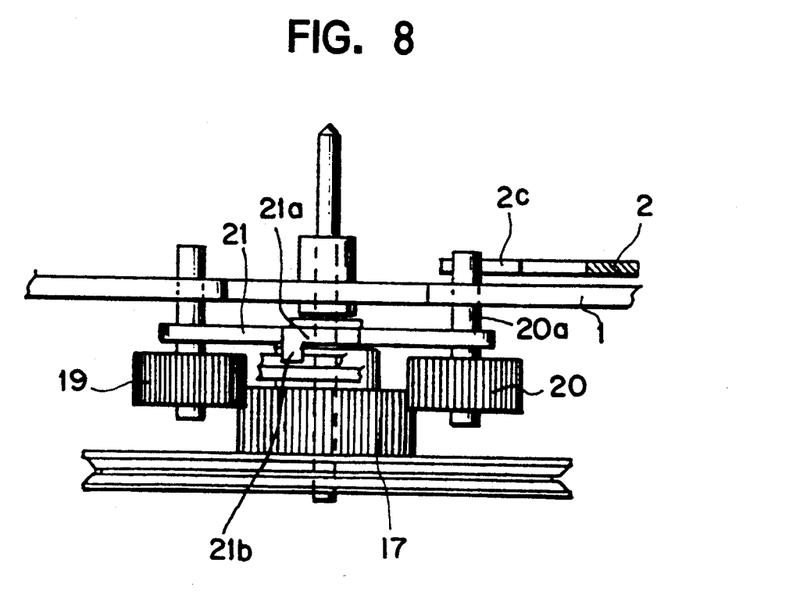
FIG. 8 is a front view of the stopper.

As shown in FIG. 15, the idler arm 21 is formed with an extension 21a extending toward the partially toothed gear 27 and a pin 21b protruding downwardly is provided at the forward end of the extension 21a. The pin 21b operates, as shown in FIG. 7, to engage the circular arc shaped protrusion 27a on the partially toothed gear 27 to prevent the idler arm 21 from rotating clockwise in FIG. 15. As shown in FIGS. 1, 2 and 8, a stopper 2c is formed in the sliding plate 2 for engaging the shaft 20a of the idler gear 20 on the idler arm 21 to prevent the idler arm 21 from rotating counterclockwise.

Figure 11:
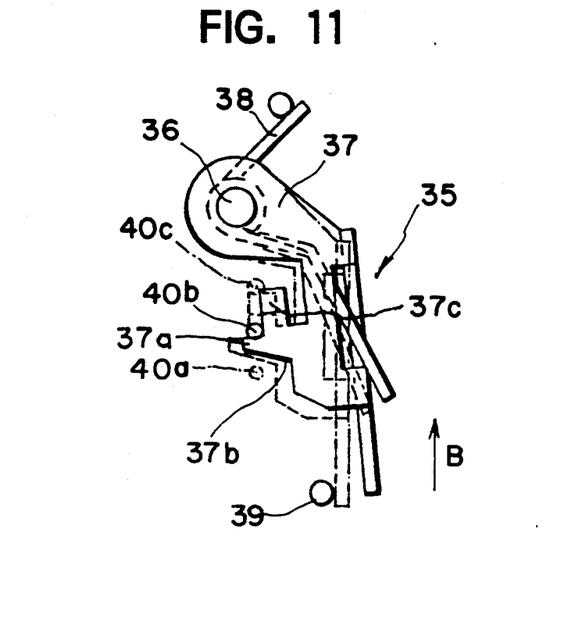
FIG. 11 is a plan view of the stopper when the sliding plate is in intermediate position.
Figure 12:
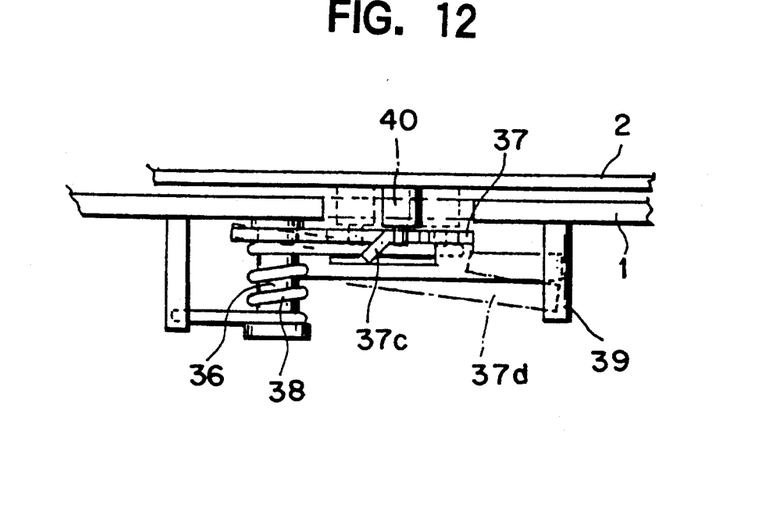
FIG. 12 is a side view of the stopper in FIG. 11.

As shown in FIG. 1, a lock mechanism 35 is provided on the base 1 for maintaining the sliding plate 2 in the said intermediate position. The details of the lock mechanism 35 are shown in FIGS. 11 and 12. The lock mechanism 35 has a lock plate 37 swingably attached to the base 1 below a side of the sliding plate 2 with a pin 36. The lock plate 37 is biased clockwise in FIG. 11 by a spring 38. The lock plate 37 has a lock finger 37a protruding transversely at a side edge and a slope 37b is formed at the rear of the lock finger 37a. An extension 37c is formed at a side of the lock finger 37a and the forward end of the extension 37c is slanted downwardly as shown in FIG. 12. Reference number 39 is a stopper restricting the clockwise rotation of the lock plate 37.

The sliding plate 2 is provided with a pin 40 protruding downwardly as shown in FIG. 12 and the pin 40 is in a position apart from the slope 37b in the lock plate 37 as indicated by 40a in FIG. 11 when the sliding plate 2 is in the retracted position. At that time, the lock plate 37 is in a position indicated by a broken line in FIG. 11 under the biasing force of the spring 38. When the sliding plate 2 is pushed toward the operating position against the effect of the spring 24, the pin 40 abuts on the slope 37b and then moves in the direction of an arrow B in FIG. 11 thereby causing the lock plate 37 to swing counterclockwise under the cam effect of the slope 37b. When the pin 40 passes the finger 37a of the lock plate 37, the pin 40 comes into a state of lock engagement with the finger 37a as indicated by 40b in FIG. 11. This position is the said intermediate position of the sliding plate 2. At this intermediate position, the sliding plate 2 is locked in the intermediate position as the pin 40 engages the finger 37a of the lock plate 37. The lock plate 37 is held in a position slightly swung counterclockwise as indicated by a solid line in FIG. 11. When the sliding plate reaches the operating position, the pin 40 comes into the state out of the extension 37c of the lock plate 37 as indicated by 40c in FIG. 11. In this state, the lock plate 37 returns to the position indicated by the broken line in FIG. 11. When the sliding plate 2 returns to the opposite direction to the arrow B from the said state under the effect of the spring 24, the pin 40 abuts on the slope 37c and then passes above the lock plate 37 thereby causing the lock plate 37 to slant as indicated in FIG. 12 by a broken line 37d.

CONTROL CIRCUIT

Figure 13:
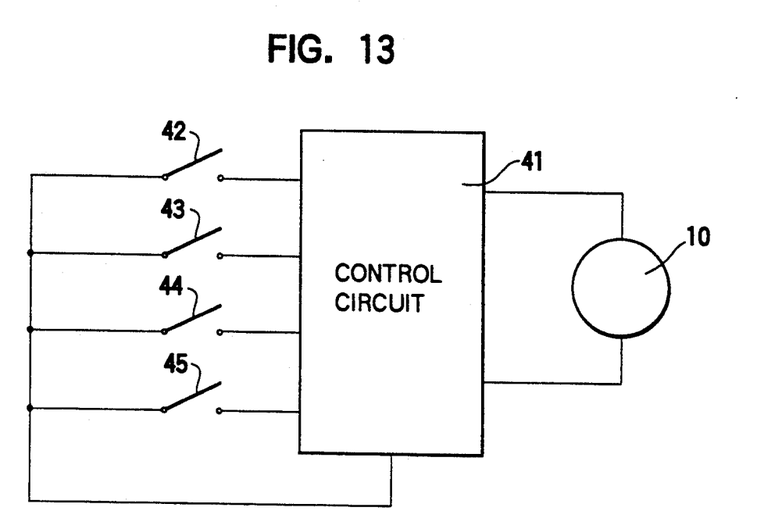
FIG. 13 is a circuit diagram of a control circuit of the driving device.
Figure 14:
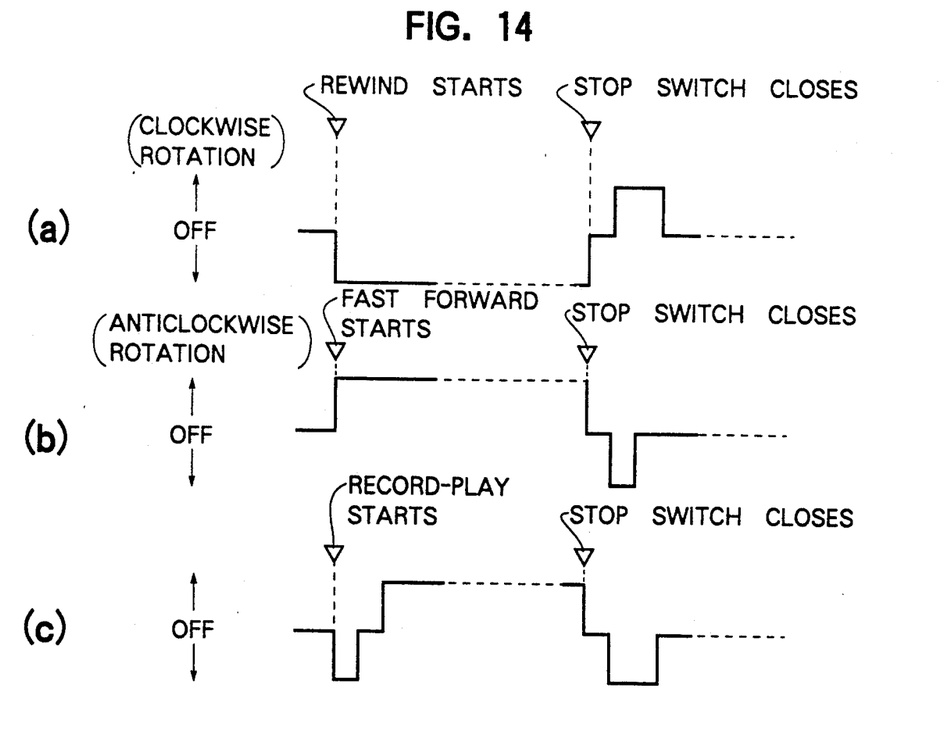

A control circuit of the motor 10 in the present driving device is shown in FIG. 13. The motor 10 is connected with the output of a control circuit 41 constituted with a microcomputer for example. The input of the control circuit 41 is connected with a rewind switch 42, a fast forward switch 43, a record-play switch 44 and a stop switch 45. When the switch 42 is closed in the rewind step, electric current in the rewinding direction is supplied to the motor 10 as shown in FIG. 14(a). When the stop switch 45 is closed in the rewind step, electric current opposite to the rewinding direction is supplied during a predetermined period and then the supply of the electric current is stopped. Next, when the fast forward switch 43 is closed, electric current in feeding direction is supplied to the motor 10 as shown in FIG. 14(b). After that, when the stop switch 45 is closed, electric current opposite to the feeding direction is supplied during a predetermined period and then the supply of the electric current is stopped. When the record-play switch 44 is closed, electric current in rewinding direction is supplied during a predetermined period. Then electric current in feeding direction is supplied. When the stop switch 45 is closed, electric current in rewinding direction is supplied during a predetermined period. Then the supply of the electric current is stopped.

OPERATION (REWIND)

Figure 5:
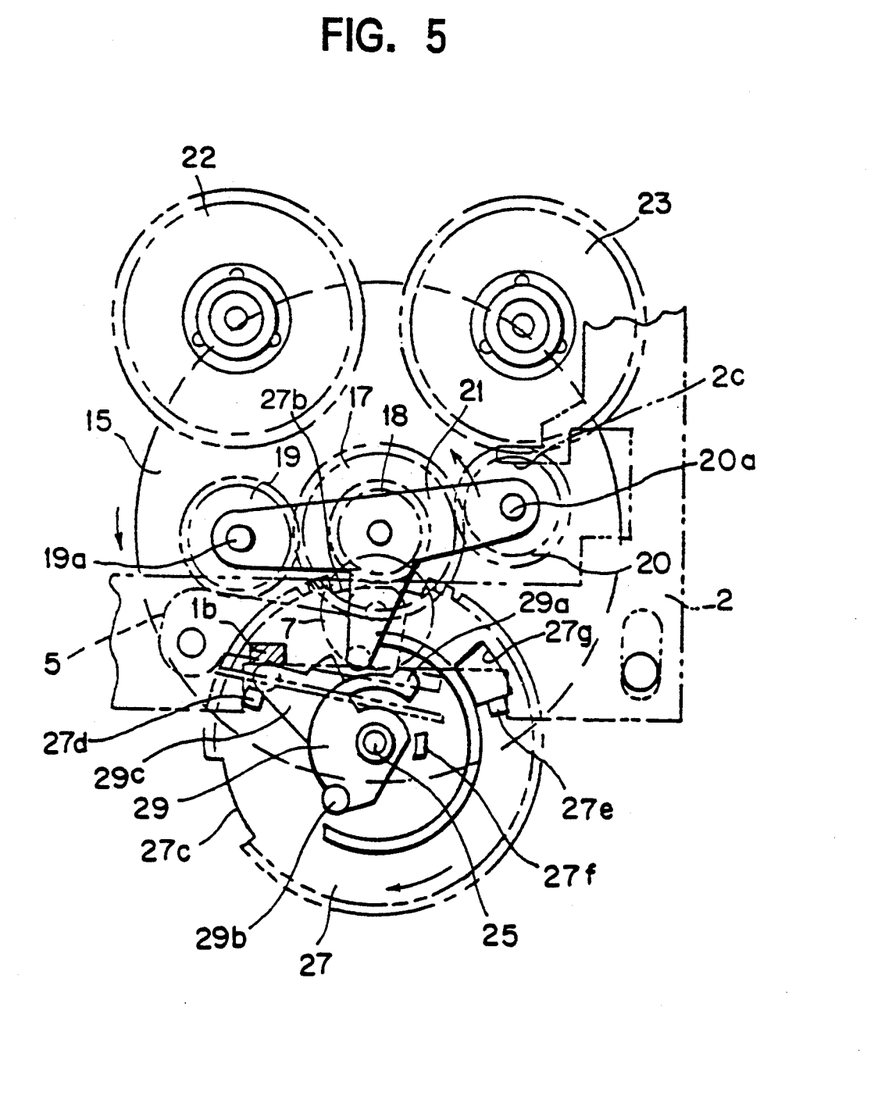
FIG. 5 is a plan view of the driving device in rewind operation.

The pulley 15 is driven to rotate counterclockwise from the stop position shown in FIG. 1. The rotation of the pulley 15 causes simultaneous counterclockwise rotation of the gears 17, 18 to drive gears 26, 27 clockwise. When the gear 27 rotates clockwise, the protrusion 27f on the gear 27 engages the edge of the sliding plate 2 to slightly move the sliding plate 2 against the effect of the spring 24 as shown in FIG. 15. At the same time, the protrusion 27d on the partially toothed gear 27 engages the pin 29d on the arm 29c of the cam 29 to rotate the cam 29 clockwise as shown in FIG. 15. When the cam 29 rotates clockwise, the cam protrusion 29a on the cam 29 engages the edge of the sliding plate 2 to move the sliding plate against the effect of the spring 24. This state is shown in FIG. 5. At this state, the 1st non-toothed portion 27b of the partially toothed gear 27 reaches the engaging position with the gear 18 and the partially toothed gear 27 stops rotation as the gears 27 and 18 come out of engagement.

In this state, the rotation of the large driving gear 17 is transmitted to the idler gear 20 and as a reaction, counterclockwise torque is applied to the idler arm 21, which causes a swing of the arm 21 to bring the gear 20 into engagement with a gear 23 on the feed reel shaft. Thus, the rewind is carried out by the torque transmitted from the gear 17 through the gear 20 to the gear 23. In this rewind state, the sliding plate 2 does not reach the operating position and the pinch roller 7 is kept apart from the capstan 14.

As shown in FIG. 5, in the rewind state, the protrusion 29a on the cam 29 is in a position slightly rotated past the dead point where the sliding plate 2 is forced into the maximum stroke position. Thus, the cam 29 is restrained from being forced back counterclockwise by the force of the spring 24 acting on the sliding plate 2. In this position, the clockwise rotation of the cam 29 is also restrained as the arm 29c of the cam 29 abuts on a stopper 1b formed downwardly and protrudingly on the base 1 as shown in FIG. 4.

When the stop switch 45 is closed in the rewind state, electric current opposite to the rewinding direction is supplied to the motor 10 as shown in FIG. 14(a). Thus, the motor 10 rotates the gear 17 clockwise in FIG. 1 and the rotation of the gear 17 causes the clockwise rotation of the driven gear 26. The partially toothed gear 27 contacts frictionally with the gear 26 through the friction plate 28 and the friction force transmits the rotation of the gear 26 to the partially toothed gear 27 to rotate the partially toothed gear 27. When the partially toothed gear 27 rotates slightly, the partially toothed gear 27 comes into engagement with the driving gear 18. As the driving gear 18 is driven clockwise similarly to the gear 17, the partially toothed gear 27 comes to be driven by the driving gear 18. As the partially toothed gear 27 rotates, the protrusion 27f on the partially toothed gear 27 engages the cam 29 to rotate the cam 29 counterclockwise. The rotation of the cam 29 causes the protrusion 29a on the cam 29 to come out of the engagement with the edge of the sliding plate 2 and the sliding plate 2 returns to the retracted position under the effect of the spring 24. When the partially toothed gear 27 returns to the position shown in FIG. 1, the motor 10 stops. As a straight edge 29i formed diametrically opposite to the arm 29c engages an edge of the sliding plate 2 and is pushed by the sliding plate 2, the cam 29 is rotated to the position where the straight edge 29i is aligned with the edge of the sliding plate 2 as shown in FIG. 1.

OPERATION (FAST FORWARD)

Figure 6:
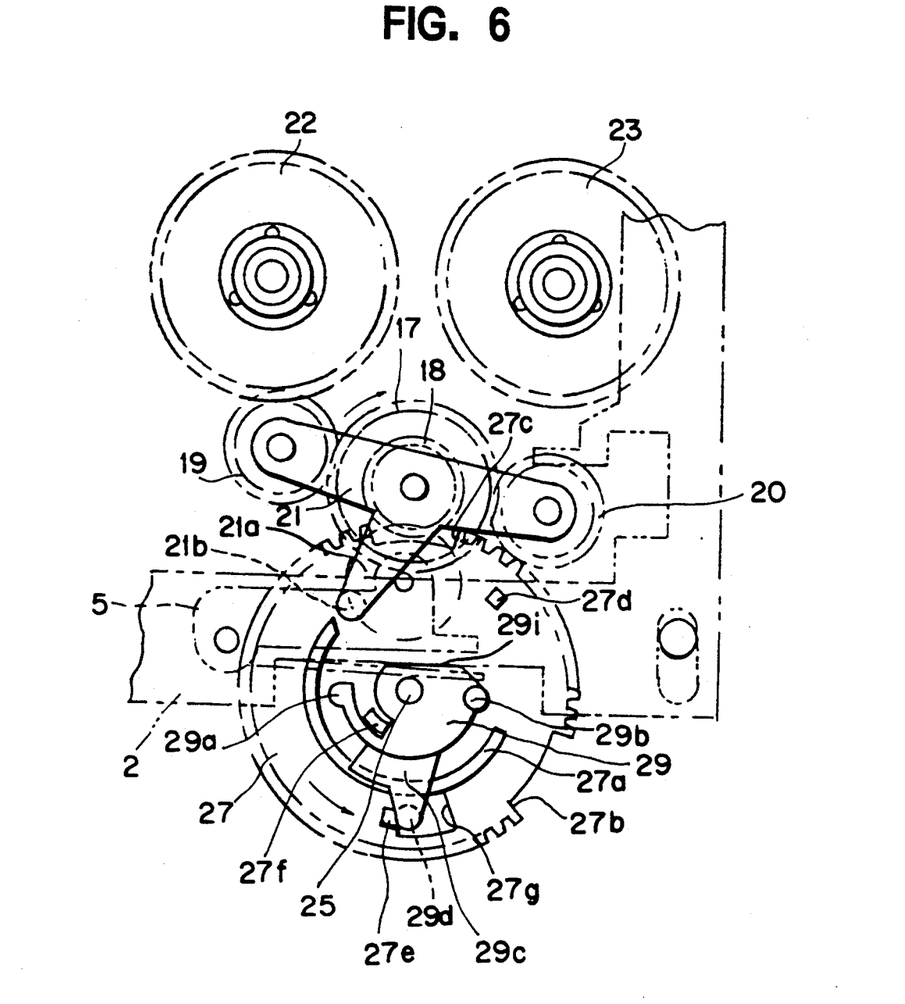
FIG. 6 is a plan view of the driving device in a fast forward condition.

In the fast forward, the motor 10 is rotated to the tape feeding direction. The rotation of the motor 10 causes the clockwise rotation of the gears 17, 18 and the clockwise rotation of the gear 18 causes a counterclockwise rotation of the partially toothed gear 27. At this time, the cam 29 is restrained from rotation as the straight edge 29i is in engagement with the edge of the sliding plate 2. When the partially toothed gear 27 rotates counterclockwise from the position in FIG. 1 to the position in FIG. 6, the pin 21b on the extension 21a of the idler arm 21 comes out of the engagement with the protrusion 27a on the partially toothed gear 27. Thus, the idler arm 21 becomes swingable and rotates clockwise under the reaction against the driving force of the gear 17 to cause the idler gear 19 to engage the gear 22 on the take-up reel shaft. After that, the gear 22 is driven by the gear 17 through the idler gear 19 and the tape is taken up by the take-up reel at high speed. In this position, the 2nd non-toothed portion 27c in the partially toothed gear 27 is in the engagement position with the driving gear 18 and the partially toothed gear 27 comes out of the engagement with the driving gear 18. Thus, the partially toothed gear 27 stops rotation. As shown in FIG. 6, the protrusion 27e on the partially toothed gear 27 engages the pin 29d on the arm 29c of the cam 29 while the cam 29 is restrained from the rotation as the straight edge 29i engages the edge of the sliding plate 2. Thus, the partially toothed gear 27 is not rotated by the driving force transmitted from gear 26 through the friction plate 28.

When the stop switch 45 is closed in the fast forward state, electric current opposite to the feeding direction is supplied to the motor 10 as shown in FIG. 14(b). The rotation of the motor 10 drives the gears 17, 18 counterclockwise and the rotation of the gear 17 drives the driven gear 26 clockwise. This rotation of the driven gear 26 is transmitted to the partially toothed gear 27 through the friction plate 28 and the partially toothed gear 27 rotates counterclockwise. When the partially toothed gear 27 rotates slightly, the partially toothed gear 27 engages the driving gear 18 and after that, the partially toothed gear 27 is driven by the gear 18. When the partially toothed gear 27 returns to the position shown in FIG. 1, the motor 10 stops.

OPERATION (RECORD AND PLAY)

Figure 9:
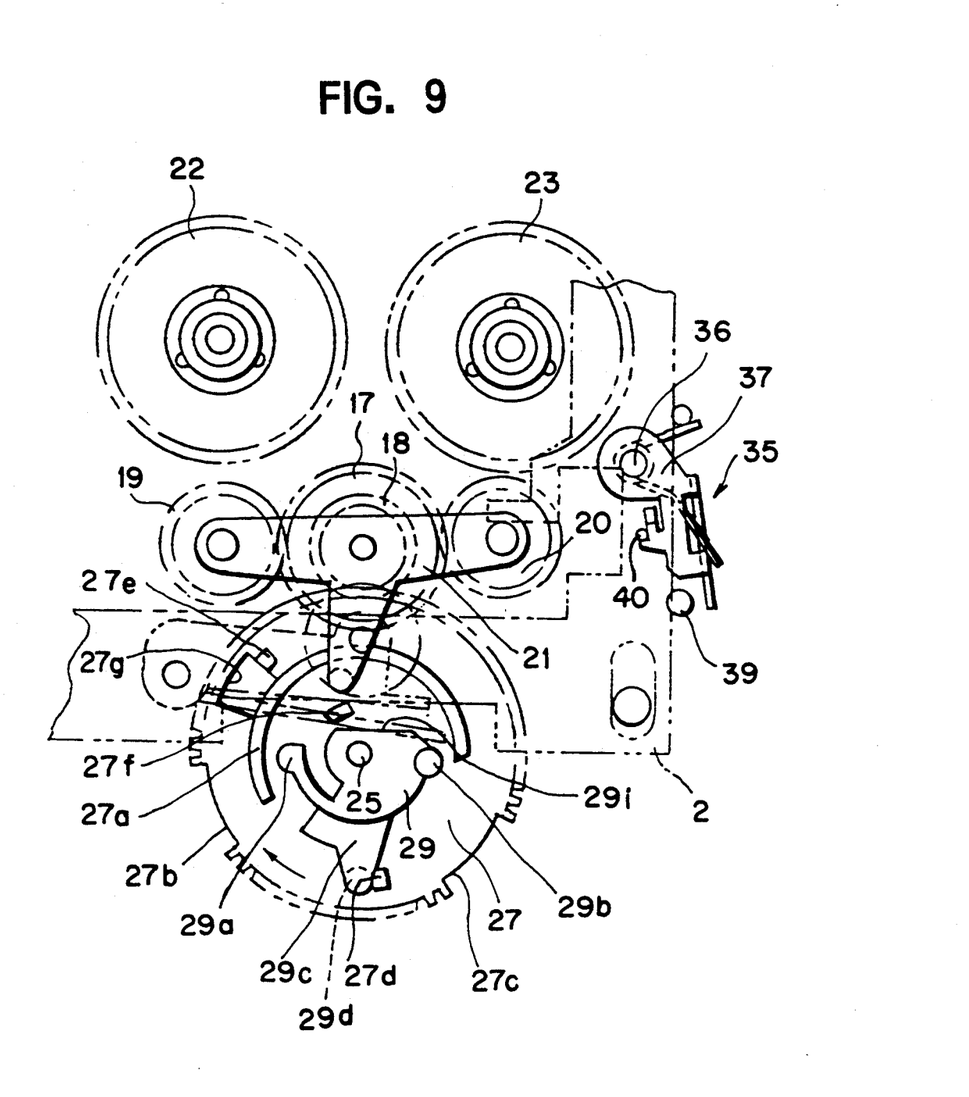
FIG. 9 is a plan view of the driving device in a transient state to a record-play condition.
Figure 10:
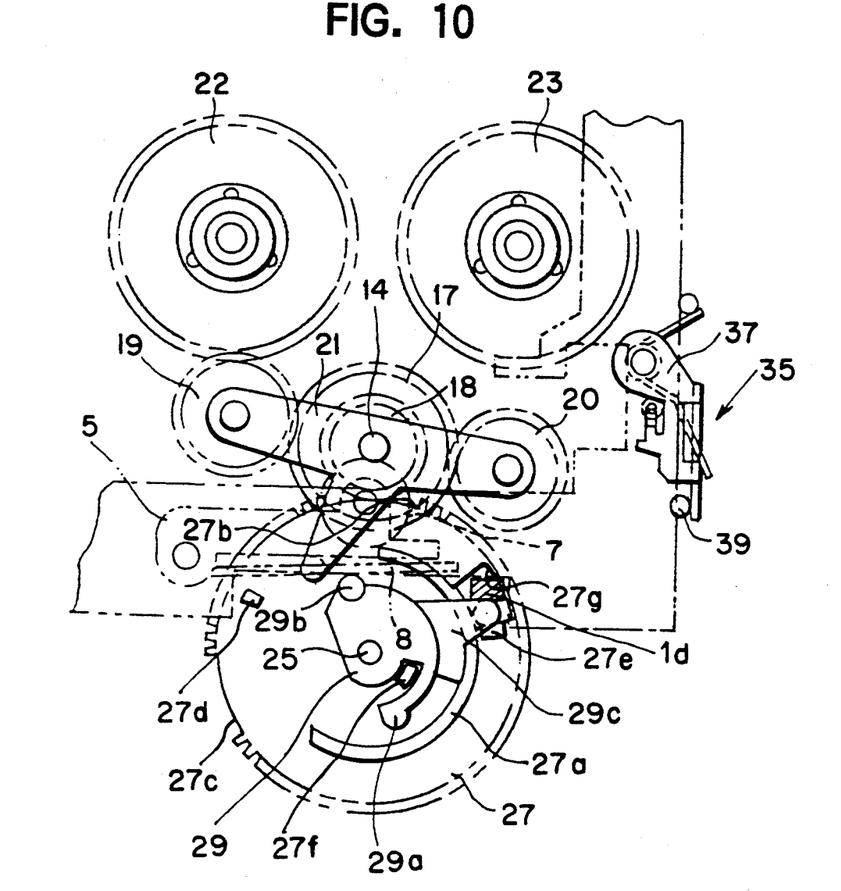
FIG. 10 is a plan view of the driving device in the record-play condition.

In the record and play, first, electric current opposite to the feeding direction is supplied to the motor 10 as shown in FIG. 14(c). The rotation of the motor 10 drives the gear 17, 18 counterclockwise. Thus, the partially toothed gear 27 is driven clockwise as shown by an arrow in the FIG. 9. As the partially toothed gear 27 rotates, the protrusion 27f on the partially toothed gear 27 engages the edge of the sliding plate 2 to push the sliding plate 2 to the operating position against the effect of the spring 24. When the sliding plate 2 moves to the said intermediate position, the pin 40 on the sliding plate 2 engages the lock finger 37a provided to the lock plate 37 of the lock mechanism 35 shown in FIGS. 11 and 12 and a state indicated by the solid line in the FIG. 11 is caused. The state where the sliding plate 2 is in the intermediate position is shown in FIG. 9. At this state, electric current in the feeding direction is supplied to the motor 10. The rotation of the motor 10 drives the partially toothed gear 27 counterclockwise through the gear 18. Thus, the protrusion 27e on the partially toothed gear 27 engages the pin 29d on the arm 29c of the cam 29 and drives the cam 29 counterclockwise. As the cam 29 rotates, the cam protrusion 29b engages the edge of the sliding plate 2 and drives the sliding plate 2 from the intermediate position further to the operating position. When the sliding plate 2 reaches the operating position, the 1st non-toothed portion 27b in the partially toothed gear 27 comes to the engagement position with the gear 18. Thus, the partially toothed gear 27 stops the rotation. This state is shown in FIG. 10. As the tip of the protrusion 29b on the cam 29 has, as shown in FIG. 4, a pin shape protruding upwardly, the cam 29 engages the spring 8 of the pinch roller arm 5 at the position shown in FIG. 10 and pushes the spring 8 toward the capstan 14 to bias the arm 5 and the pinch roller 7 toward the capstan 14 under the effect of the spring 8. Thus, the pinch roller 7 is pushed against the capstan 14 with the tape between them and the tape is fed by the driving force imparted to the capstan 14.

A slant 1c is formed on the lower surface of the base 1 as shown in FIGS. 3 and 4. The slant 1c engages the end part of the arm 29c just before the cam 29 reaches the operating position shown in FIG. 10 and pushes the cam 29 downwardly in an axial direction. Under the effect of the slant 1c, the cam 29 is pushed downwardly in the axial direction just before it reaches the position shown in FIG. 10 and the pin 29d on the tip of the arm 29c engages the opening 27g formed in the partially toothed gear 27. In the position shown in FIG. 10, the tip of the arm 29c of the cam 29 engages a stopper 1d formed protrudingly on the lower surface of the base 1 as shown in FIGS. 3, 4 and 10 and the cam 29 is restrained from rotation. As the opening 27g in the partially toothed gear 27 engages the pin 29d on the arm 29c of the cam 29, the partially toothed gear 27 is not rotated by the torque transmitted from the gear 17 through the gear 26 and friction plate 28.

When the stop switch 45 is closed in a record-play state, electric current opposite to the feeding direction is supplied to the motor 10. The rotation of the motor 10 causes the rotation of the small driven gear 26 through the large driving gear 17 and the rotation of the gear 26 is transmitted to the partially toothed gear 27 through the friction plate 28. Thus, the partially toothed gear 27 rotates clockwise in FIG. 10 and the partially toothed gear 27 comes into a state in which the partially toothed gear 27 engages the driving gear 18. After that, the partially toothed gear 27 is driven clockwise by the driving gear 18. The cam 29 rotates clockwise with the rotation of the partially toothed gear 27 as the pin 29d engages the opening 27g in the partially toothed gear 27. The rotation of the cam 29 causes the movement of the sliding plate 2 toward the retracted position under the effect of the spring 24. In this movement of the sliding plate 2, the pin 40 on the sliding plate 2 passes over the slant on the extension 37c of the lock plate 37 at the position of the lock mechanism 35 and returns to the retracted position as already described with FIGS. 11 and 12.

INDUSTRIAL APPLICABILITY

As described above, according to the present invention, the sliding plate supporting the magnetic head and the pinch roller is moved to the operating position under the effect of the cam in the record-play operation. Thus, there is no necessity to provide an electromagnetic solenoid means to move the sliding plate from the retracted position to the operating position as in the drive unit of the prior art tape recorder and the drive unit can be constituted generally in small size and in light weight. Moreover, there is no necessity to drive the solenoid means all the time during the record-play operation. Thus, the power consumption can also be substantially decreased.

What is claimed is:

1. A tape recorder, comprising:
   a support;
   a capstan, feed reel shaft and take-up reel shaft mounted to said support;
   a driving means for rotating said capstan;
   a sliding plate;
   a magnetic head and a pinch roller mounted on said sliding plate;
   transport means for moving said sliding plate on said support in a given direction of motion between a retracted position and an operating position, wherein said pinch roller approaches said capstan to engage a recording tape therebetween, with said magnetic head being in contact with said recording tape, in said operating position, and said pinch roller and said capstan being spaced from each other to release said recording tape, with the magnetic head being out of contact with the recording tape, in said retracted position;
   said transport means comprising:
   (a) a first driving gear and a second driving gear coupled to said driving means for rotation thereby,
   (b) a first driven gear coupled to said first driving gear for rotation thereby,
   (c) a second driven gear coupled to said second driving gear for rotation thereby, (d) coupling means to frictionally couple said first and second driven gears to each other, (e) a cam having means to drive said sliding plate from its said retracted position toward its said operating position, (f) means on said second driven gear for rotating said cam as said second driven gear is being driven rotatingly, and (g) means to inhibit rotation of the second driven gear by said second driving gear when said second driven gear reaches a predetermined rotational angle, and including at least one non-toothed portion on said second driven gear, said first driven gear remaining drivingly coupled with the first driving gear when the non-toothed portion of said second driven gear uncouples it from said second driving gear; and control means coupled to said transport means for setting the tape recorder into one of at least a record-play operation and a rewind operation by controlling a direction of rotation of at least one of said first and second driving gears, and wherein said control means actuates the driving means to rotate the first driving gear, after rotation of the second driven gear by the second driving gear has been inhibited, at least until a toothed portion of the second driven gear is drivingly coupled with the second driving gear as said first driven gear rotates said second driven gear via said coupling means.

2. The tape recorder of claim 1, wherein said control means comprises actuation means for selectively coupling one of a feed reel and a take-up reel to said driving means, said feed reel and said take-up reel being respectively mounted on said feed reel shaft and said take-up reel shaft.

3. The tape recorder of claim 1, wherein said first and second driven gears are mounted coaxially, and said coupling means is a friction plate mounted therebetween and in frictional engagement therewith.

4. The tape recorder of claim 1, wherein said means to inhibit rotation of the second driven gear by the second driving gear comprises a pin extending from the cam for a part of a distance between said cam and said second driven gear, and an opening formed in said second driven gear so as to be alignable with said pin when said cam and said second driven gear reach a predetermined rotational position, and camming means on said support for stopping further rotation of said cam in its turning direction and displacing said pin in substantially its axial direction so that, when said cam and said second driven gear reach said predetermined rotational position, said pin enters said opening to block said second driven gear against further rotation in its turning direction.

5. The tape recorder of claim 4, wherein said control means actuates the driving means to rotate the first driving gear after further rotation of the second driven gear in its turning direction has been blocked to rotate said second driven gear via said first driven gear and said coupling means in a turning direction opposite to the turning direction in which further rotation was blocked.

6. The tape recorder of claim 1, wherein said control means comprises a pair of idler gears rotatably attached at opposite ends of a swingable idler arm, respectively, said pair of idler gears being drivingly coupled to said driving means, said idler arm being coupled with said driving means to be swingable in a swinging movement from a neutral position where neither of the pair of idler gears engages either a feed shaft gear on said feed reel shaft or a take-up shaft gear on said take-up reel shaft to either of a first position where one of the pair of idler gears engages one of the feed shaft gear and the take-up shaft gear, and a second position where the other of the pair of idler gears engages the other of the feed shaft gear and the take-up shaft gear;

said sliding plate having a first stopper means for preventing the swinging movement of the idler arm from said neutral position to reach said first position, said control means setting said tape recorder in one of a fast forward operation and a rewind operation by actuating the transport means to displace the sliding plate from said retracted position toward said operating position by a distance so as to disengage the stopper means from the idler arm to release the idler arm for swinging to said first position.

7. The tape recorder of claim 6, further comprising a second stopper means on said second driven gear for preventing the swinging movement of the idler arm to reach said second position, said control means setting the other of the fast forward operation and the rewind operation by actuating the transport means to rotate said second driven gear to a predetermined angular position at which the idler arm is disengaged from the second stopper means for swinging toward its said second position.

* * * * *